United States Patent [19]

Simmons

[11] Patent Number: 4,640,134
[45] Date of Patent: Feb. 3, 1987

[54] APPARATUS AND METHOD FOR ANALYZING ACOUSTICAL SIGNALS

[75] Inventor: James A. Simmons, Eugene, Oreg.

[73] Assignee: Bio-Dynamics Research & Development Corporation, Eugene, Oreg.

[21] Appl. No.: 596,523

[22] Filed: Apr. 4, 1984

[51] Int. Cl.⁴ .................. G01H 3/08; G01R 23/165
[52] U.S. Cl. .................... 73/648; 324/77 B; 324/77 E; 324/78 F
[58] Field of Search .............. 324/77 B, 77 E, 78 D, 324/78 F; 328/130.1; 381/39, 48, 49; 73/648, 659

[56] References Cited

U.S. PATENT DOCUMENTS

| 2,602,836 | 7/1952 | Foster et al. ............... 324/77 B |
| 2,635,146 | 4/1953 | Steinberg ....................... 381/38 |
| 3,321,582 | 5/1967 | Schroeder ..................... 381/49 |
| 3,422,422 | 1/1969 | Frank et al. ...................... 377/51 |
| 3,581,192 | 5/1971 | Miura et al. ................. 324/77 E |
| 3,676,565 | 7/1972 | Rowe ........................... 324/77 B |
| 4,093,989 | 6/1978 | Flink et al. .................... 324/77 B |
| 4,339,711 | 7/1982 | Inami et al. ................... 324/77 E |
| 4,523,506 | 6/1985 | Hollimon ...................... 324/78 D |

*Primary Examiner*—Stewart J. Levy
*Assistant Examiner*—John E. Chapman, Jr.
*Attorney, Agent, or Firm*—Finnegan, Henderson, Farabow, Garrett & Dunner

[57] ABSTRACT

A zero-crossing accoustical signal analyzer includes a plurality of parallel-connected adjacently tuned filter channels to separate an incoming accoustical signal into a plurality of adjacent sub-bands. Zero crossing analysis is provided for each of the sub-bands to determine the time period between successive zero crossings of signal components within each of the sub-bands. The reciprocal of the time periods from each sub-band is then simultaneously provided on a frequency vs. time display. Each filter channel also produces a signal proportional to the amplitude of signal frequency components within the respective sub-band for producing a frequency vs. amplitude display.

14 Claims, 19 Drawing Figures

APPARATUS AND METHOD FOR ANALYZING ACOUSTICAL SIGNALS

BACKGROUND OF THE INVENTION

The present invention relates to an acoustical signal analyzer for producing a sound spectrogram, and more particularly to a signal analyzer of this type which uses the method of zero-crossing analysis to produce a sound spectrogram.

In many areas of scientific research, there is a need to analyze the sounds produced by men, animals, and machines. For example, a study of the ultrasonic signals produced by bats is useful in understanding the process by which a bat can locate small fast-moving objects. This knowledge is being applied in the development of various types of apparatus including equipment to aid persons with visual handicaps.

A particularly useful type of acoustical signal analysis is the study of the frequency of sound signals produced over a period of time; that is, a spectral history of the sound. The output of instruments producing a spectral history of an acoustical signal is called a sound spectrogram, or a time versus frequency plot.

Various methods were used in the prior art to produce sound spectrograms. In one type of apparatus, analog audio signals were stored and subsequently analyzed by analog techniques using a sweeping bandpass filter or a bank of fixed bandpass filters. Alternatively, digital analysis was performed on the stored signal using a mathematical technique known as Fast Fourier Transformation (FFT). Although useful data were produced by such prior art apparatus, several problems were encountered. Since the signal was required to be stored and then subsequently analyzed, the output of data was often not as rapid as desired. Furthermore, such apparatus was large, complex, and expensive, and was thus more suitable for the laboratory than for field use.

A more economical method of producing a sound spectrogram involves the technique of zero-crossing analysis. In this technique, an analog AC audio signal alternating between positive and negative voltages is analyzed to measure the time period between successive crossings of zero voltage in the signal waveform. The time period between successive zero-crossings is the reciprocal of frequency; that is: frequency=1/period. Such time periods are much more easily measured than are frequencies of the analog signal being analyzed. By graphing the reciprocals of the time periods between successive zero-crossings of a signal of arbitrary duration, it is possible to obtain a spectral history of the principle or fundamental frequency component of the signal.

Signal analyzers using the technique of zero-crossing analysis can be constructed in small, lightweight, easily portable packages, thus providing instruments suitable for use in field research. Furthermore, since the accuracy of the measurements depends upon the stability of a clock signal produced by a crystal oscillator and not upon bulky and environmentally-dependent single frequency tuned circuits, zero crossing signal analyzers can be successfully operated under the adverse conditions often found in the field. Zero-crossing analysis is also inherently much faster than the prior art techniques of signal storage and after-the-fact analysis. Thus, a signal analyzer using zero-crossing techniques can perform signal analysis in substantially real time.

Unfortunately, zero-crossing signal analyzers of the prior art are susceptible to several problems. If a signal being analyzed includes a number of different frequencies, certain phase and amplitude relationships between the individual frequency components of the signal can cause known zero-crossing analyzers to produce inaccurate results. For example, one dominant frequency may sometimes completely mask the presence of another frequency. Under other conditions, two or more signals can combine to produce data indicating the presence of a spurious frequency not actually present in the waveform being analyzed.

It is therefore an objective of the present invention to provide apparatus for analyzing acoustical signals which incorporates the speed, portability, environmental insensitivity, and low cost of zero-crossing techniques, yet which will also provide the accuracy and data integrity of laboratory equipment.

SUMMARY OF THE INVENTION

The present invention overcomes the problems and disadvantages of the prior art by providing a signal analyzer which accepts as input an acoustical analog signal which may have signal components extending over a band of frequencies. The analyzer separates the frequency spectrum of the incoming analog signal into a number of separate sub-bands. The signal components in each of the sub-bands are then analyzed individually to produce zero-crossing time period information for each of the sub-bands. This zero-crossing time period information is then processed by taking the reciprocal of each of the zero-crossing time periods and interleaving the reciprocal data into a single display by apparatus which scans the output of the circuitry processing each sub-band. The masking of one signal frequency component by another and the production of spurious frequencies not actually present in the acoustical signal being analyzed are thus avoided.

Objects and advantages of the invention will be set forth in part in the description which follows, and in part will be obvious from this description, or may be learned from the practice of this invention. The objects and advantages of the invention may be realized and obtained by means of the instrumentalities in combinations particularly pointed out in the appended claims.

To achieve the objects and in accordance with the purpose of the invention as embodied and broadly described herein, an analyzer for analyzing an acoustical signal having a plurality of signal components extending over a band of signal frequencies comprises means for separating an acoustical signal into a plurality of sub-bands, means for measuring the time period between successive zero-crossings of signal components in each of the sub-bands, means for extracting the reciprocal of the zero-crossing time periods of signal components in each sub-band, and means for simultaneously displaying the time period reciprocals of signal components in each of the sub-bands.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIGS. 3a and 3b show a time domain waveform of another multiple-frequency acoustical signal and the sound spectrogram produced therefrom, respectively, by a prior art zero-crossing signal analyzer, the signal components of the acoustical signal having a different phase and amplitude relationship than the frequency components of the signal shown in FIG. 2a;

FIGS. 4a and 4b show a time domain waveform of a third multiple component acoustical signal and a sound spectrogram produced therefrom, respectively, by a prior art zero-crossing signal analyzer, the signal components of the signal shown in FIG. 4a being different than the signal components of the signal shown in FIGS. 2a and 3a;

DESCRIPTION OF THE PREFERRED EMBODIMENT

Reference will now be made in detail to the presently preferred embodiment of the invention, an example of which is illustrated in accompanying drawings.

Figure 1A:
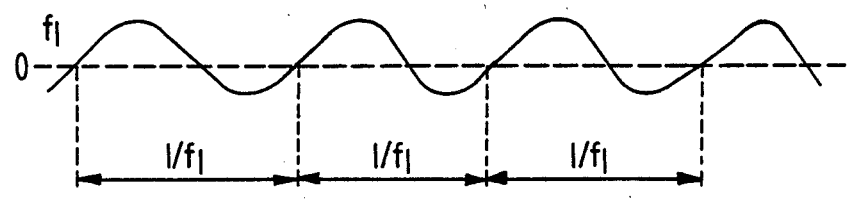
FIGS. 1a and 1b show a time domain waveform and a sound spectrogram produced therefrom, respectively, for an acoustical signal having a single signal component.
Figure 1B:
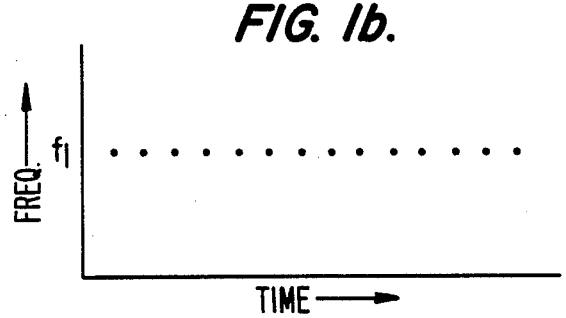

FIG. 1a shows a sinusoidal time domain waveform of an acoustical signal with a frequency of $f_1$ and successive periods of $1/f_1$. The time history of this signal is shown in FIG. 1b as a time-vs.-frequency plot (i.e., a sound spectrogram) of successive values of the reciprocal of the period, which is $f_1$. If all signals that are of interest contained only one signal component at any given time, this type of graph would adequately describe the spectral history of the signal.

Figure 2A:
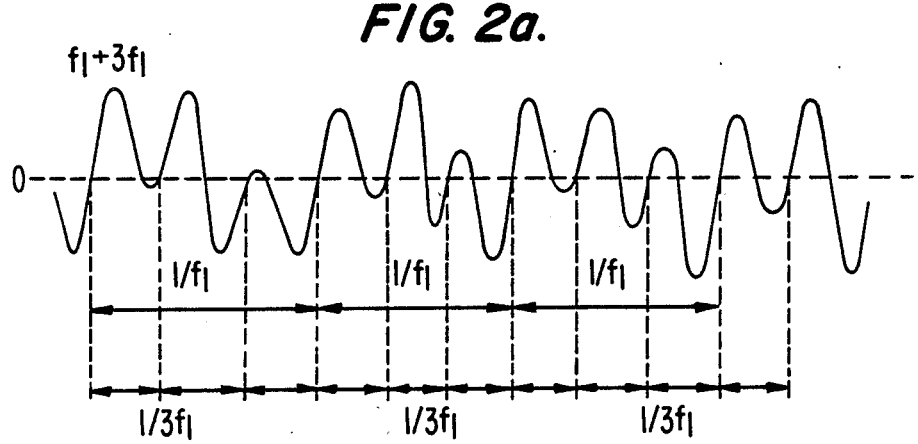
FIGS. 2a and 2b show a time domain waveform of a multiple-frequency acoustical signal and sound spectrogram produced therefrom, respectively, by a prior art zero-crossing signal analyzer.
Figure 2B:
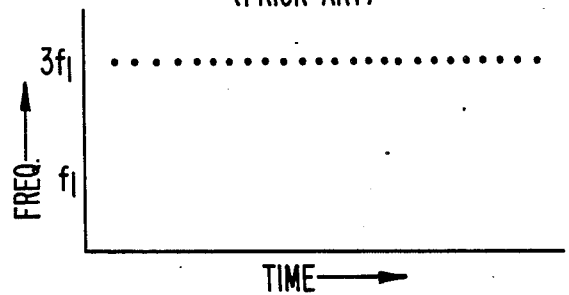

FIG. 2a shows a time domain waveform of another acoustical signal containing two signal components, having frequencies $f_1$ and $3f_1$ (the first and third harmonics of $f_1$), with the same starting phase-angle. The periods of both $f_1$ and $3f_1$ appear in the zero-crossing intervals shown in FIG. 2a, but a sound spectrogram (FIG. 2b) of the reciprocals of successive periods produced by prior art zero-crossing signal analyzers shows only $3f_1$; the presence of $f_1$ in the periods is hidden by the intervening repetition of the shorter periods for $3f_1$. The use of a graph of reciprocals of zero-crossing periods thus fails to adequately characterize the spectral history of this signal.

Figure 3A:
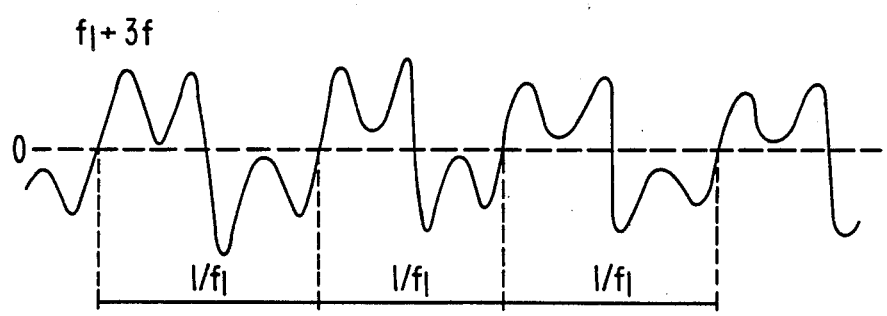
Figure 3B:
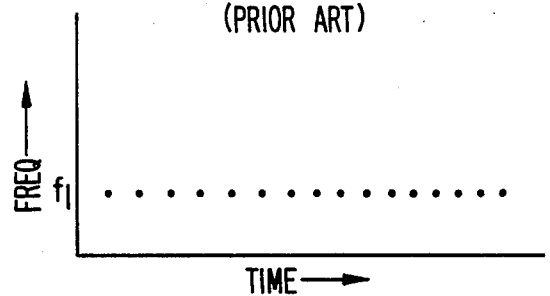

FIG. 3a shows the time domain waveform of another signal containing both $f_1$ and $3f_1$ signal components, but with a slightly different amplitude and phase relationship between the signal components than that of the signal of FIG. 2a. Successive zerocrossing periods corresponding to $1/f_1$ appear in the sound spectrogram of FIG. 3b produced by prior art apparatus, but none corresponding to $\frac{1}{3}f_1$, since the higher-frequency signal component $3f_1$ is riding too high on the peaks of the lower frequency signal component $f_1$ for $3f_1$ to cause shorter period zero-crossings separate from the zero-crossings of the lower frequency signal component. Consequently, the time-vs.-frequency graph shows only $f_1$, not $3f_1$, and the spectral history of the signal once again is inadequately characterized.

Figure 4A:
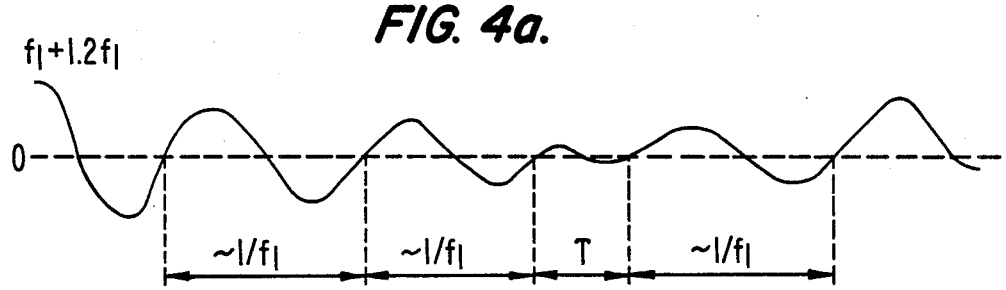

FIG. 4a shows the time domain waveform of yet another acoustical signal having two signal components with frequencies having values in a ratio of 4 to 5. One frequency is $f_1$, and the other is 1.2 $f_1$. The zero-crossing periods reveal the presence of both $f_1$ and 1.2 $f_1$, so neither signal component is hidden or masked from appearing in a graph of the reciprocals of successive periods. However, periods (T) appear in FIG. 4a corresponding to a spurious signal component with a frequency $f_T$ that is not present in the signal, and the time-vs.-frequency plot of FIG. 4b produced by prior art zero-crossing signal analyzers thus shows both the actual and the spurious signal components as being present.

From FIGS. 1a and 1b to 4a and 4b, it is clear that a complete description of the frequency composition, wave-by-wave, of a signal cannot generally be obtained with the simple zero-crossing analysis of the prior art. Although a signal component having one frequency, usually (but not always) the fundamental or first-harmonic frequency, appears in time-vs.-frequency graphs of reciprocals of successive zero-crossing periods, a true representation of the spectral history of an arbitrary signal cannot be obtained in this way.

Figure 4B:
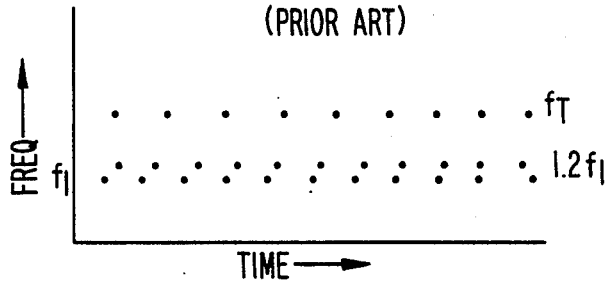
Figure 6:
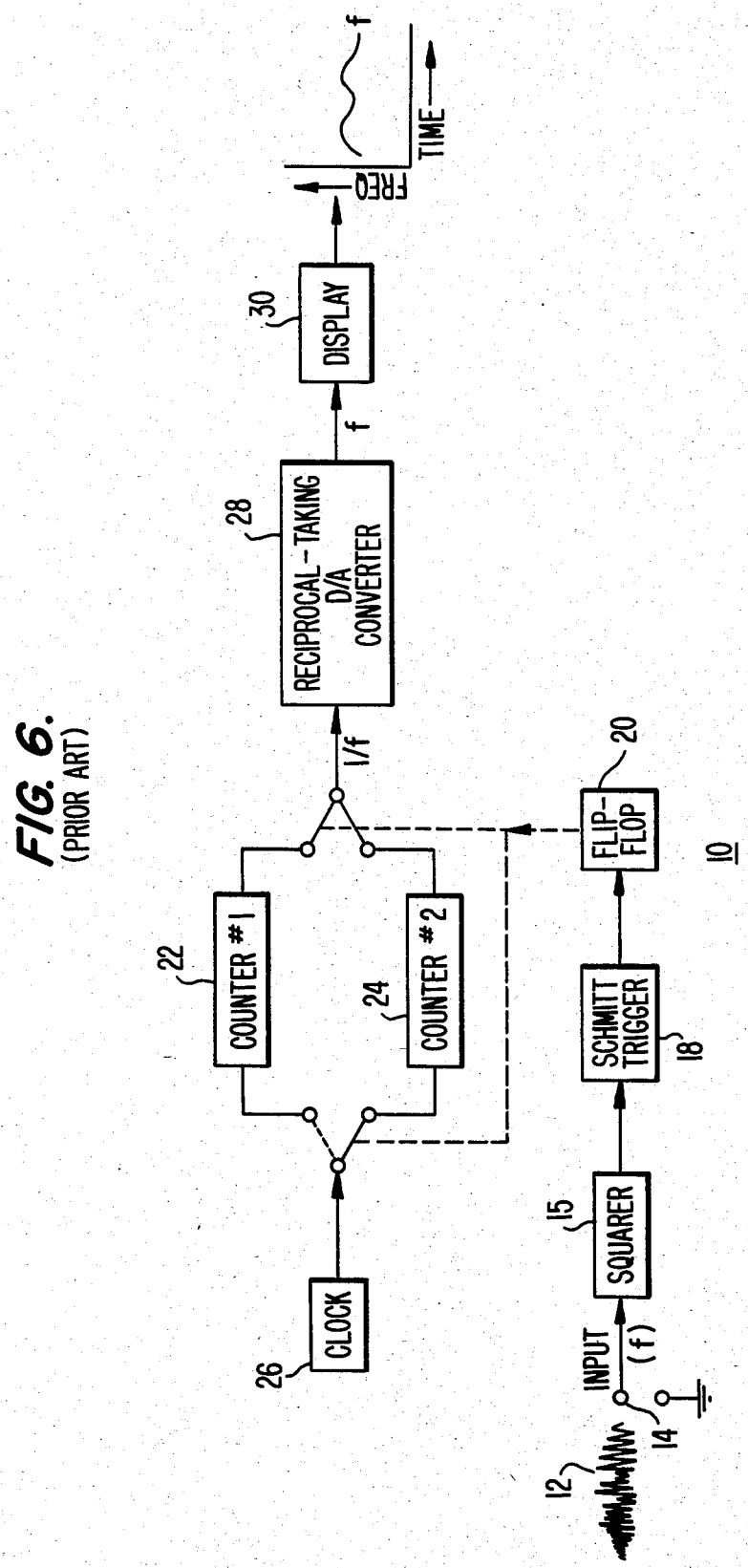
FIG. 6 is a block diagram of a prior art of zero-crossing signal analyzer.

A block diagram of a prior art zero-crossing spectrum analyzer 10 is shown in FIG. 6. Analyzer 10 detects the positive-going zero-crossings of an analog acoustical input signal 12 applied to an input 14, using a squaring amplifier, or squarer, 15 and a Schmitt trigger 18. The zero-crossing events are used to toggle a flip-flop 20 into one of two states on alternate periods of signal 12. Two counters 22 and 24 into which pulses of a clock 26 are gated build up a count corresponding to individual periods of input signal 12. When one counter is receiving clock pulses to accumulate a period count, the other counter is displaying the previous, already counted, period. It is connected through a reciprocal-taking digital-to-analog converter 28 to display on a device 30 the frequency corresponding to the period occurring just prior to the period of the count now being accumulated in the other counter. Prior art spectrum analyzer 10 counts every zero-crossing period, interleaving the count and display functions. It will only display one signal component (usually the fundamental frequency signal component or the signal component with the greatest amplitude) from a signal, however, and it will display spurious signal components, as illustrated in FIG. 4a and 4b, if the zero-crossing periods do not correspond to a frequency of a signal component that is physically present in the signal 12.

The previously described disadvantages of prior art zero-crossing spectrum analyzers such as shown in FIG. 6 are overcome by the present invention by breaking the overall bandwidth of signal 12 into several separate sub-bands, using bandpass filter channels tuned to adjacent parts of the signal analyzer bandwidth. Zero-crossing analysis is performed separately in each filter channel, so that the simultaneous presence of two or more signal components will not result in a display that misses frequencies that are present or introduces nonexistent frequencies. The zero-crossing periods found in each filter channel must be interleaved or sandwiched into a single display by a circuit which scans the outputs of each filter channel. The only requirements are that the filter channels be tuned to a sufficiently narrow bandpass to prevent two signal components from falling into the same filter channel, while at the same time not be so narrowly tuned that their long time-constants distort, or "smear", transient signals as a result of ringing. To pick the filter Q-values (that is, to determine the bandwidth of the subband for that filter channel), the number of parallel filter channels, and the center frequencies of the filter channels, it is necessary to be familiar with the class of signals to be analyzed and displayed. For example, if it is desired to use ten parallel filter channels because of size, weight, and cost considerations, the filter channel center-frequencies and Q-values should be chosen to encompass the band of frequencies contained in the signals of interest. If these signals include human speech sounds or bird-song, the filter channels should be tuned to frequencies from about 0.2 kHz to 6 kHz. If the signals are bat sonar sounds or the communication sounds of porpoises, the filter channels should be tuned to 4 kHz to 120 kHz. If the signals are electroencephalographs (brainwaves, or EEG's), the filter channels should be tuned to 4 kHz to 120 kHz. The Q-values for ten parallel filter channels should be in the range of 8 to 15 for optimal performance of the analyzer.

Figure 5A:
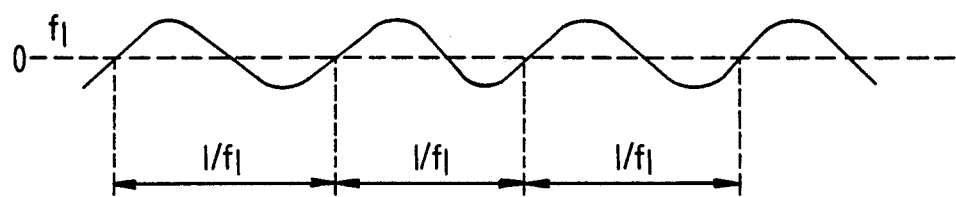
FIGS. 5a and 5b show time domain waveforms of signal components of the acoustical signal of FIG. 2 separated into first and second sub-bands.
Figure 5B:
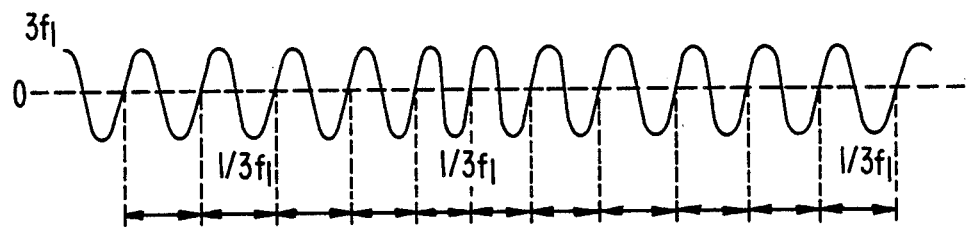
Figure 5C:
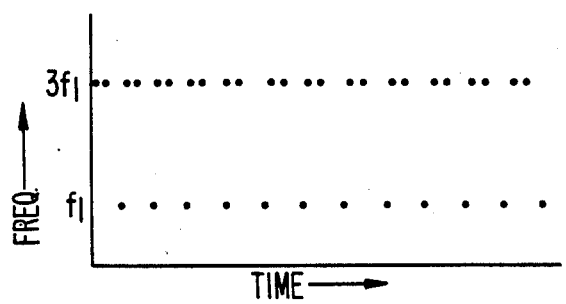
FIG. 5c shows a sound spectrogram produced from the signals of FIGS. 5a and 5b by apparatus constructed according to the principles of the present invention.
Figure 7:
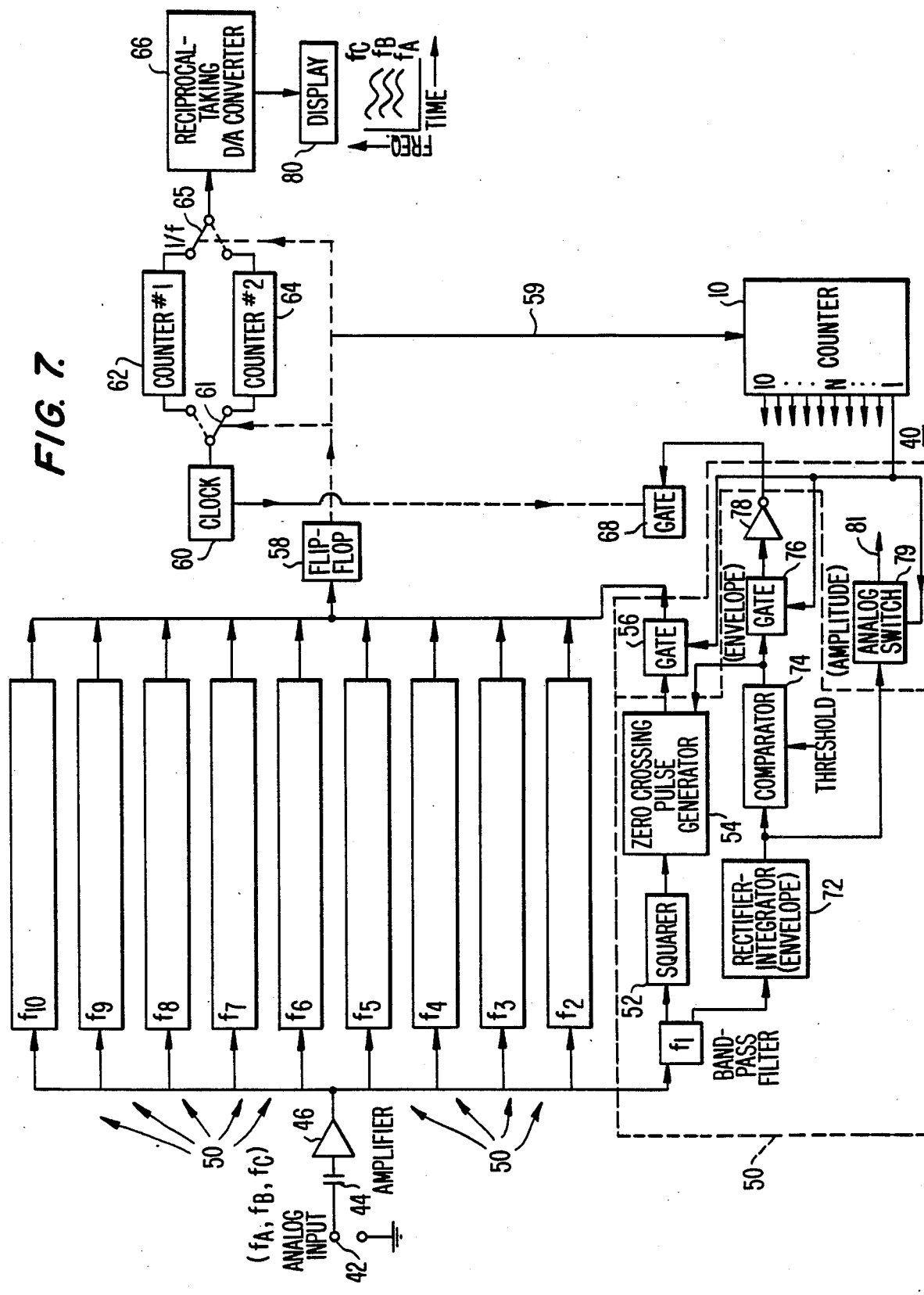
FIG. 7 is a block diagram of a zero-crossing signal analyzer of a preferred embodiment of the present invention.

FIG. 7 illustrates an embodiment of the present invention which provides a parallel-channel, zero-crossing frequency analyzer 40 which accomplishes the display of multiple frequencies in complex signals. FIGS. 5a–5c illustrate how such a device would display the structure of a complex signal containing two discrete signal components having frequencies $f_1$ and $3f_1$. A prior art zero-crossing analyzer 10 (FIG. 6) would display this signal in the manner shown in FIG. 2b or FIG. 3b. It would thus be an incomplete display of the frequency content of the signal, with one or the other signal component missing. The parallel-channel zero crossing analyzer 40 (FIG. 7) breaks the signal into component sub-bands in ten filter channels and indicates, from zero-crossing periods, the presence of both $f_1$ and $3f_1$ (FIG. 5c). If the input signal were to contain two closely-spaced signal components, $f_1$ and $1.2 f_1$, the prior art zero-crossing analyzer 10 (FIG. 6) would display spurious frequencees (FIG. 4b) with values depending upon the amplitude and phase relationships of the components of the waveform. The analyzer 40 embodying the present invention would only display such spurious frequencies if the two signal component frequencies fell close to the center frequency of a particular filter channel. The spurious frequency being displayed is, however, sometimes useful for characterizing complex waveforms using pattern-recognition techniques, even though its presence in the display is otherwise not desired.

Analyzer 40 includes means for separating an acoustical signal into a plurality of sub-bands. As embodied herein, this separating means includes an analog input terminal 42, a coupling capacitor 44, and an amplifier 46. The output of amplifier 46 is connected to a plurality of filter channels 50 also included in the separating means, each filter channel 50 including a bandpass filter $f_1$–$f_{10}$. The center frequencies of each of the bandpass filters $f_1$–$f_{10}$ are different and the bandpass limits of each of the bandpass filters $f_1$–$f_{10}$ are selected so as to be adjacent in frequency, thereby providing the analyzer 40 with a continuous bandpass from the lowest frequency of interest to the highest frequency of interest. It is to be understood that each of the filter channels 50 is identical in construction, with the exception of the center frequency and bandpass limits of the respective bandpass filter. For purposes of clarity, only the filter channel 50 which includes bandpass filter $f_1$ is shown in detail.

A first output of the bandpass filter $f_1$ is supplied through a squarer 52 to a zero-crossing pulse generator 54. After the AC output signal from bandpass filter $f_1$ is shaped into a square wave by squarer 52, zero-crossing pulse generator 54 produces a zero-crossing control pulse for every positive-going zero-crossing of the output signal from bandpass filter $f_1$. Zero-crossing control pulses from zero-crossing pulse generator 54 are supplied through a scan gate 56 (controlled in a manner to be described below) to a flip-flop 58.

The analyzer 40 also includes means for measuring the period between successive zero-crossings of signal components in each of the sub-bands. As embodied herein, the measuring means includes a clock 60 and a pair of counters 62 and 64. Clock 60 provides a series of regularly occurring clock pulses to either of the two counters 62 or 64.

In addition, the analyzer 40 includes connecting means for supplying the clock pulses to the counters in response to zero-crossing control pulses. As embodied herein, this connecting means includes a switch 61 for switching clock pulses between counters 62 and 64, and flip-flop 58 for controlling switch 61 in response to zero-crossing control pulses. The output of counters 62 and 64 is supplied to a switch 65.

The analyzer 40 further includes means for extracting the reciprocal of the zero-crossing time periods of signal components in each of the sub-bands. As embodied herein, this extracting means includes a reciprocal-taking digital-to-analog converter 66 (hereinafter called a reciprocal DAC) connected to switch 65 which produces an analog output signal proportional to the reciprocal of the digital signal provided by either counter 62 or counter 64. The output of flip-flop 58 is used to toggle the output of clock 60 between counters 62 and 64, and also to toggle, in an opposite sense, the output of counters 62 and 64 to the input of the reciprocal DAC 66. As can be seen in FIG. 7, when counter 64 is accumulating pulses from clock 60, the output of counter 62 is being provided to reciprocal DAC 66.

The output of flip-flop 58 is also supplied over a line 59 to scanning means for sequentially connecting the filter channels 50 to the connecting means such that a pair of zero-crossing control pulses from a connected filter channel causes the connecting means to supply a number of clock pulses to the counters proportional to the time period between zero-crossings of the output of the bandpass filter of the connected filter channel. As embodied herein, the scanning means includes a scan counter 70, a gate 68, and a pair of scan gates 56 and 76. Pulses from clock 60 are also supplied through gate 68 to scan counter 70. As can be seen in FIG. 7, scan counter 70 has ten outputs. Each of these ten outputs is individually and selectively activated such that the next output in sequence is activated upon receipt of either a pulse from clock 60 or a signal from flip-flop 58. Each output of scan counter 70 is connected to scan gate 56, scan gate 76, and an analog switch 79 of a separate filter channel 50.

The output of bandpass filter $f_1$ is also supplied to means for producing an activation signal whenever the output signal from bandpass filter $f_1$ exceeds a predetermined threshold. As embodied herein, this producing means includes a rectifier integrator 72 and a comparator 74. Rectifier-integrator 72 provides an analog signal proportional to the amplitude of the output signal of bandpass filter $f_1$. This analog signal is supplied to a comparator 74, along with an adjustable threshold signal supplied through a threshold input terminal of comparator 74. Thus, the output of comparator 74 is activated whenever the signals input to terminal 42 includes a frequency component within the bandpass of filter $f_1$ which has an amplitude greater than a threshold signal supplied through the threshold terminal of comparator 74. Correspondingly, the output of comparator 74 is deactivated when the output signal from bandpass filter $f_1$ is less than the threshold signal supplied to the threshold terminal of comparator 74.

The output of comparator 74 is supplied to a gate 76, the control input of which is connected to a corresponding output terminal of scan counter 70. The output terminal of scan gate 76 is supplied through an inverter 78 to the control input of gate 68 to form an INHIBIT signal to gate 68.

The output of rectifier integrator 72 is also connected to an analog switch 79, the output 81 of which provides an analog signal proportional to the amplitude of a signal component within the bandpass of bandpass filter $f_1$.

The analyzer 40 also includes means for displaying the time period reciprocals of signal components in each of the sub-bands. As embodied herein, this display means includes an X-Y display device 80, such as a cathode ray tube, connected to the output of reciprocal DAC 66. The X coordinant of the display device 80 is proportional to time, whereas the Y coordinant thereof is proportional to frequency. Thus, a display element at a given position on the screen of display device 80 is indicative of the presence of a signal component at input terminal 42 having a certain specified frequency at a given point in time.

In operation, an audio signal possibly containing signal components within the range of interest of the analyzer 40, is supplied to analog input terminal 42. After amplification by amplifier 46, the analog input signal is supplied in parallel to each of the filter channels 50. If the signal supplied to analog input 42 contains a signal component within the bandpass of bandpass filter $f_1$, a signal will appear at the output thereof. This signal is shaped by squarer 52 and supplied to zero-crossing pulse generator 54. Zero-crossing pulse generator 54 will then supply a control pulse upon the occurrence of each positive-going zero-crossing of the signal component of the input signal which lies within the bandpass of bandpass filter $f_1$. Simultaneously, the output of bandpass filter $f_1$ is supplied to rectifier-integrator 72 which provides an analog signal proportional to the amplitude of the output of bandpass filter $f_1$. If the output of the rectifier integrator 72 is greater than the threshold voltage, comparator 74 provides an activation signal at its output. If the output of scan counter 70 corresponding to this filter channel 50 is also now activated, comparator 74, through scan gate 76, opens scan gate 56. A zero-crossing control pulse produced by positive-going zero-crossings as detected by zero-crossing pulse generator 54 thus passes through scan gate 56 to flip-flop 58, causing clock pulses to start to accumulate in one of the counters 62 or 64 as selected by switch 61. In addition, the activation signal of comparator 74 passes through scan gate 76 and inverter 78 to form an INHIBIT signal blocking the passage of pulses from clock 60 through gate 68 to scan counter 70. Thus, the activated output of scan counter 70 remains fixed and does not advance to the next output to activate a different filter channel 50.

Upon occurrence of the second zero-crossing control pulse from zero crossing pulse generator 54, the flip-flop 58 is again toggled to signify the end of a period of a signal component passing through bandpass filter $f_1$. This causes clock pulses from clock 60 to be switched from one counter 62 or 64 to the other, and the accumulated count of clock pulses occurring between the two control pulses to be supplied to reciprocal DAC 66. In addition, the output from flip-flop 58 provides a signal over line 59 to scan counter 70 causing the next available output of scan counter 70 to be sequentially activated, thus activating the next filter channel 50. If the output of the bandpass filter of the activated filter channel 50 is not above the threshold level, comparator 74 will be deactivated, and its logic low output passed through scan gate 76 and inverter 78 to remove the INHIBIT signal from gate 68. Thus, clock pulses flow from clock 60 to scan counter 70, causing scan counter 70 to activate the next sequential filter channel 50. In this manner, each of the filter channels 50 are sequentially scanned to detect the presence of a signal component above the threshold level. When such a signal component is detected, the period between successive positive-going zero-crossings of the signal component is determined by storing pulses from clock 60 in counters 62 or 64 and converted to a frequency value by reciprocal DAC 66 for display on display device 80.

Analyzer 40 thus includes mean for sequentially scanning each of the sub-bands for the presence of a signal component therein, for causing a zero-crossing time period measurement to be made if the signal component is present in the selected sub-band, and for advancing to the next sub-band if no such signal component is present. As embodied herein, this sequential scanning means includes scan counter 70, rectifier-integrator 72, comparator 74, gate 76, inverter 78, clock 60, gate 68, and scan gate 56.

Figure 13:
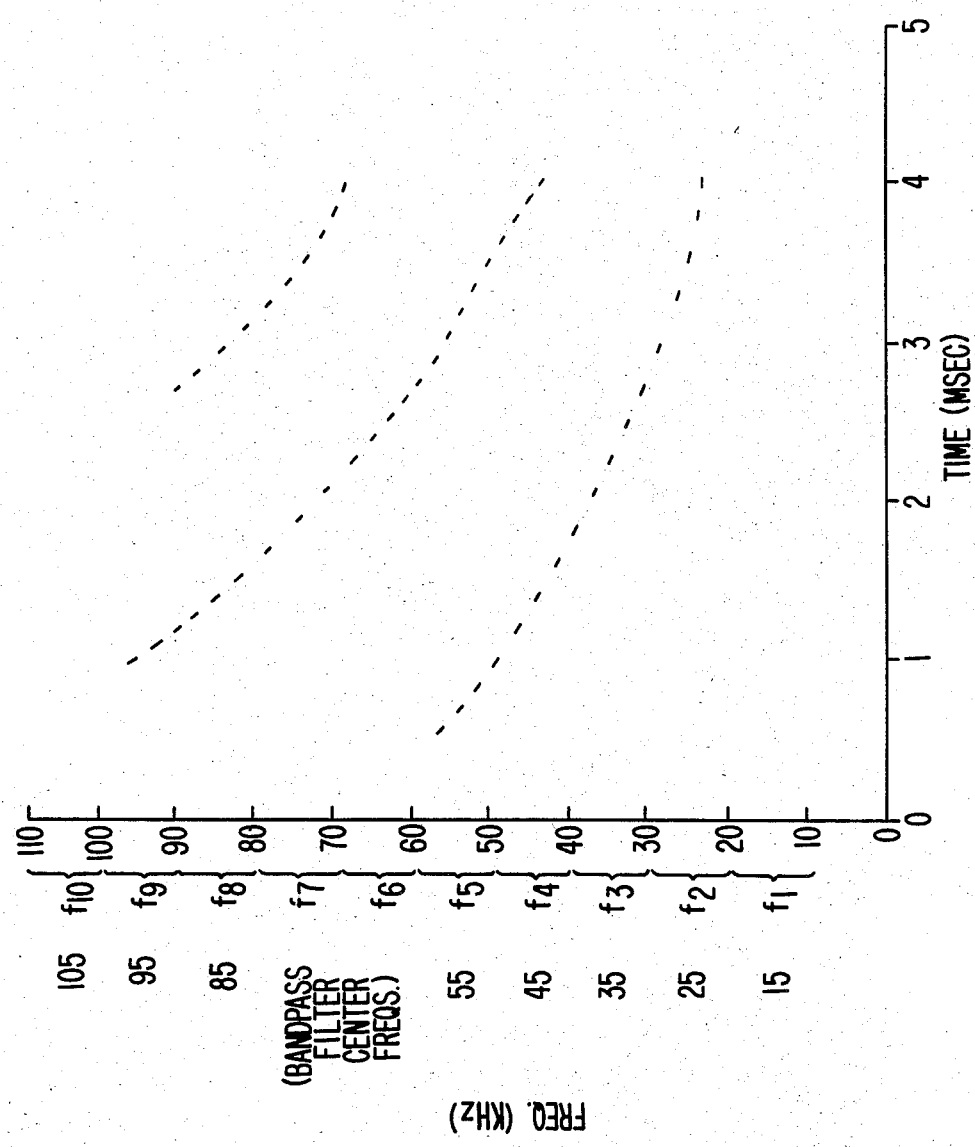
FIG. 13 is a frequency vs. time display produced under field conditions by a preferred embodiment of the present invention.

An example of a frequency vs. time display produced by analyzer 40 is shown in FIG. 13. The display of FIG. 13 was produced under field conditions in a tropical rain forest, and shows an ultrasonic signal produced by a bat in search of insects.

Figure 8:
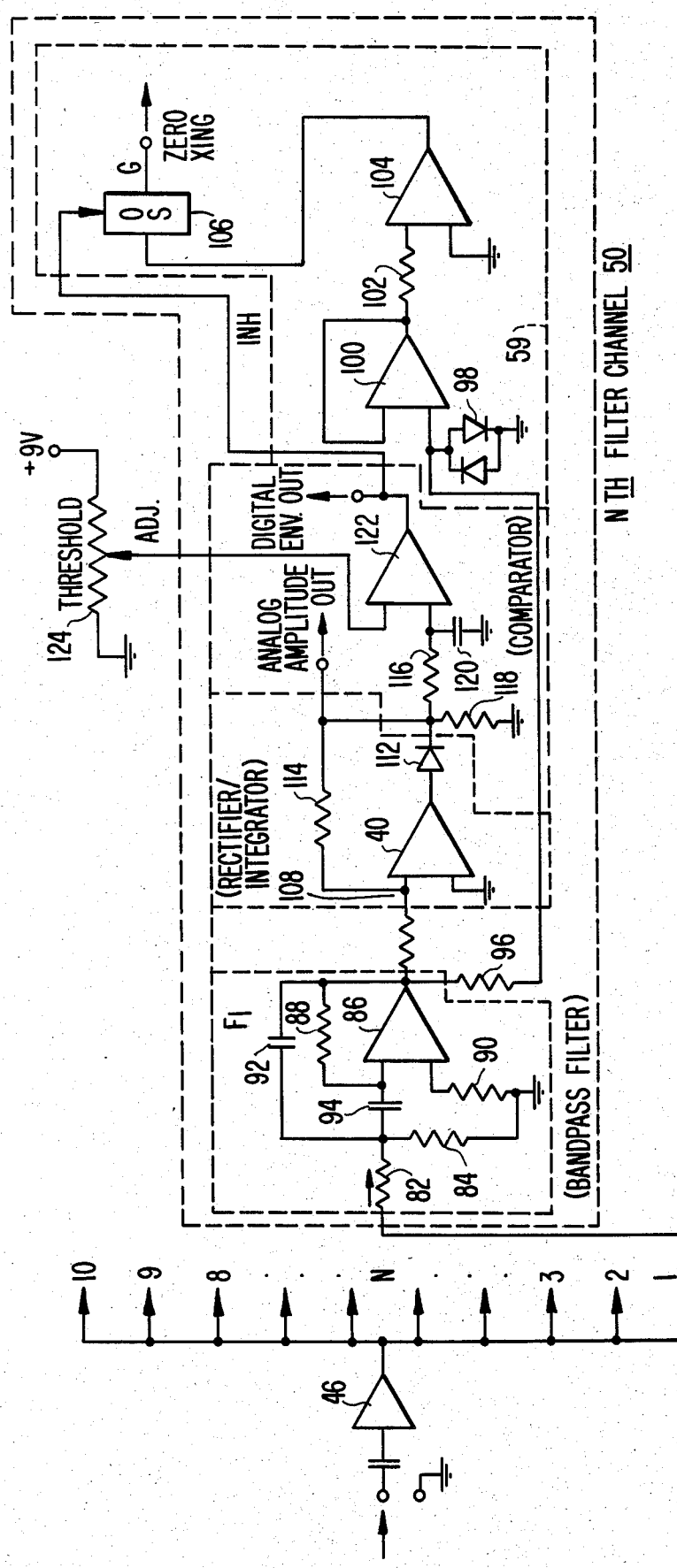
FIG. 8 is an electrical schematic diagram of a preferred embodiment of a filter channel of the apparatus shown in FIG. 7.

Referring to FIG. 8, an electrical schematic diagram of the circuitry of a preferred embodiment of a filter channel 50 is shown. The output of amplifier 46 is supplied to bandpass filter $f_1$ which includes an resistor 82 connected to one terminal of a resistor 84, the other terminal of which is connected to ground. The bandpass filter $f_1$ also includes operational amplifier 86 which may be, for example, a type LM308. Resistors 88 and 90 and capacitors 92 and 94 are connected to operational amplifier 86 in a well known manner to form a bandpass filter having the desired center frequency and bandpass limits. The output of operational amplifier 86 is supplied through a coupling resistor 96 to one set of terminals of a pair of back-to-back connected diodes 98, the other terminals of which are connected to ground. Diodes 98 and an amplifier 100 form an amplitude limiter to prevent high amplitude signals from causing undesirable "bounce" effects. Amplifier 100 may also be a type LM308 operational amplifier. The output of amplifier 100 is connected through a coupling resistor 102 to an amplifier 104 which may be a type 3130 device. Amplifier 104 converts the input signal thereof to a square wave signal to provide accurate zero-crossing information. The output of amplifier 104 is supplied to zero-crossing pulse generator 54, which constitutes means for producing zero-crossing control pulses designating the zero-crossing of output signals from bandpass filter $f_1$. As embodied herein, the zero-crossing control pulse producing means includes a one-shot device 106 which may be one-half of a type 4528 dual monostable multivibrator. One-shot device 106 provides a 15 nanosecond positive pulse upon the occurrence of a positive-going zero-crossing of the signal provided at the output of amplifier 104.

The output of amplifier 86 which forms part of bandpass filter $f_1$ is also supplied through a coupling resistor 108 to rectifier-integrator 72 which in the preferred embodiment includes an amplifier 110, the output of which is connected to one terminal of a diode 112. The output of diode 112 is connected through a feedback resistor 114 to one input of operational amplifier 110, thus forming the rectifier-integrator 72. The other input of amplifier 110 is connected to circuit ground.

The output of diode 112 is also connected to analog amplitude output terminal 115. The signal produced at terminal 115 is used to produce an optional frequency vs. amplitude display, as will be more completely described below.

The output of diode 112 is also connected to comparator 74, which in the preferred embodiment includes a voltage divider consisting of resistors 116 and 118. The terminal of resistor 116 opposite diode 112 is connected to a bypass capacitor 120 and to one input of an amplifier 122, which may also be a type CA310. The other input of amplifier 122 is connected to the wiper arm of a potentiometer 124. One end of potentiometer 124 is connected to circuit ground, while the other end of potentiometer 124 is connected to a source of positive dc voltage. Amplifier 122 and components 116, 118, and 120 form comparator 74. Potentiometer 124 provides an adjustable threshold voltage for operational amplifier 122, the output of which is a digital signal indicative of whether or not the amplitude of the output signal of bandpass filter $f_1$ exceeds the threshold voltage produced by potentiometer 124. The output of operational amplifier 122 is also supplied as an inhibit signal for one-shot 106. That is, when the output of operational amplifier 122 is a logic low, one-shot 106 is prevented from producing pulses as a result of positive-going zero-crossings supplied at the input thereof.

Figure 9:
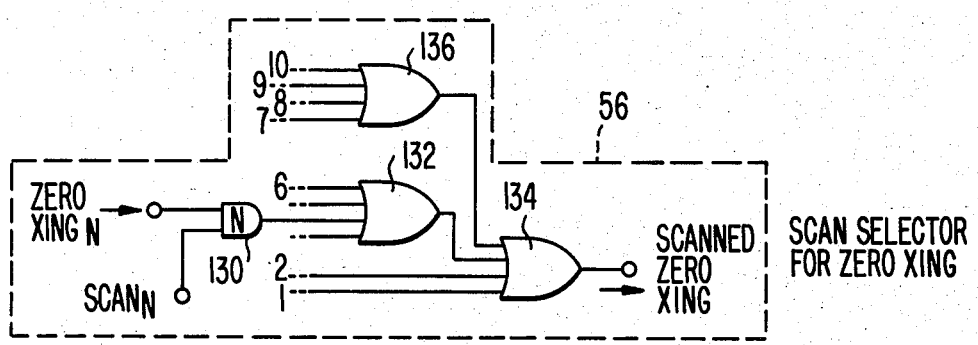
FIGS. 9 and 10 are electrical schematic diagrams of scan selectors for zero-crossing control pulses and digital envelope signals, respectively, shown in FIG. 7.
Figure 10:
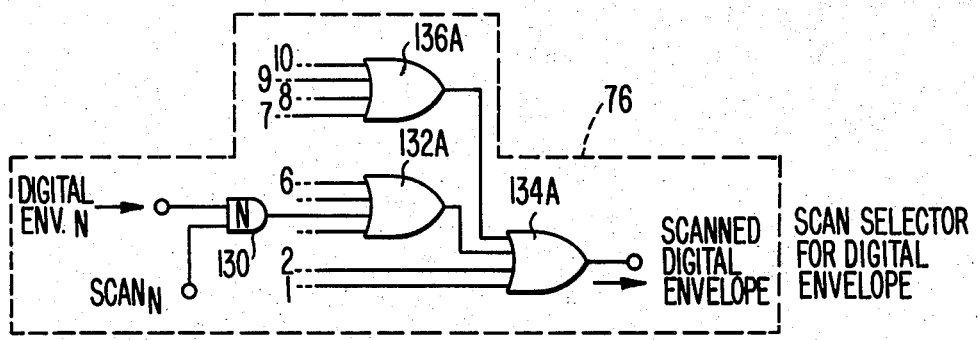

Electrical schematic diagrams of scan gates 56 and 76 of FIG. 7 are shown in FIGS. 9 and 10, respectively. The circuitry of scan gates 56 and 76 is identical. Referring now to FIG. 9, it can be seen that zero-crossing control pulses generated by zero-crossing pulse generator 54 of the Nth filter channel 50 continuing bandpass filter $f_N$ are supplied to one input of a two-input AND gate 130. The pulses so supplied are designated as ZERO XING$_N$ in FIG. 9. The other input of AND gate 130 is supplied by that output of counter 70 corresponding to Nth filter channel 50, and is labeled in SCAN$_N$ in FIG. 9. Thus, zero-crossing control pulses from the zero-crossing pulse generator 54 of the selected filter channel 50 will be passed through AND gate 130 if and only if the scan counter 70 has selected the particular filter channel in question. If so, the zero-crossing control pulses from zero-crossing pulse generator 54 pass through gate 130 to a multiple-input OR gate 132. The output of OR gate 132 is supplied to multiple-input OR gate 134. An additional multiple-input OR gate 136 is also provided in scan gate 56. For purposes of clarity, FIG. 9 only shows AND gate 130 as being connected as an input to an OR gate in scan gate 56. It is to be understood that each of the inputs to OR gates 132, 134, and 136 have attached thereto a two-input AND gate similar to gate 130 which is connected to a different filter channel 50. One of the inputs of each of the AND gates not shown is separately connected to individual remaining outputs of scan counter 70. The other input of each of the AND gates not shown is connected to the output of a zero-crossing pulse generator 54 for the remaining respective filter channels 50. Thus, it can be seen that the output of OR gate 134 consists of zero-crossing control pulses generated by the specific filter channel 50 which is selected by scan counter 70. This output is known as the scanned zero-crossing and as indicated as SCANNED ZERO XING in FIG. 9.

Referring now to FIG. 10, there is shown a two-input AND gate 130A. The lower input of AND gate 130A is connected to the same output of scan counter 70 as is the lower input of AND gate 130 of FIG. 9. The remaining input of AND gate 130A is connected to the output of comparator 74 included in Nth filter channel 50, the zero-crossing pulse generator 54 of which is also connected to the upper input of AND gate 130 of FIG. 9. Scan gate 76 of FIG. 10 also includes multiple-input OR gates 132A, 134A and 136A, the remaining inputs of which are also supplied with the outputs of two-input AND gates, not shown, which are connected to the outputs of comparators 74 for the remaining filter channel 50. The OR gates 132A, 134A, and 136A act in an identical manner to the OR gates 132, 134, and 136 of FIG. 9 to supply an output designated as the scanned digital envelope signal which, at any given time, is associated with the same filter channel 50 as is the scan zero-crossing output of OR gate 134 of FIG. 9.

Figure 11:
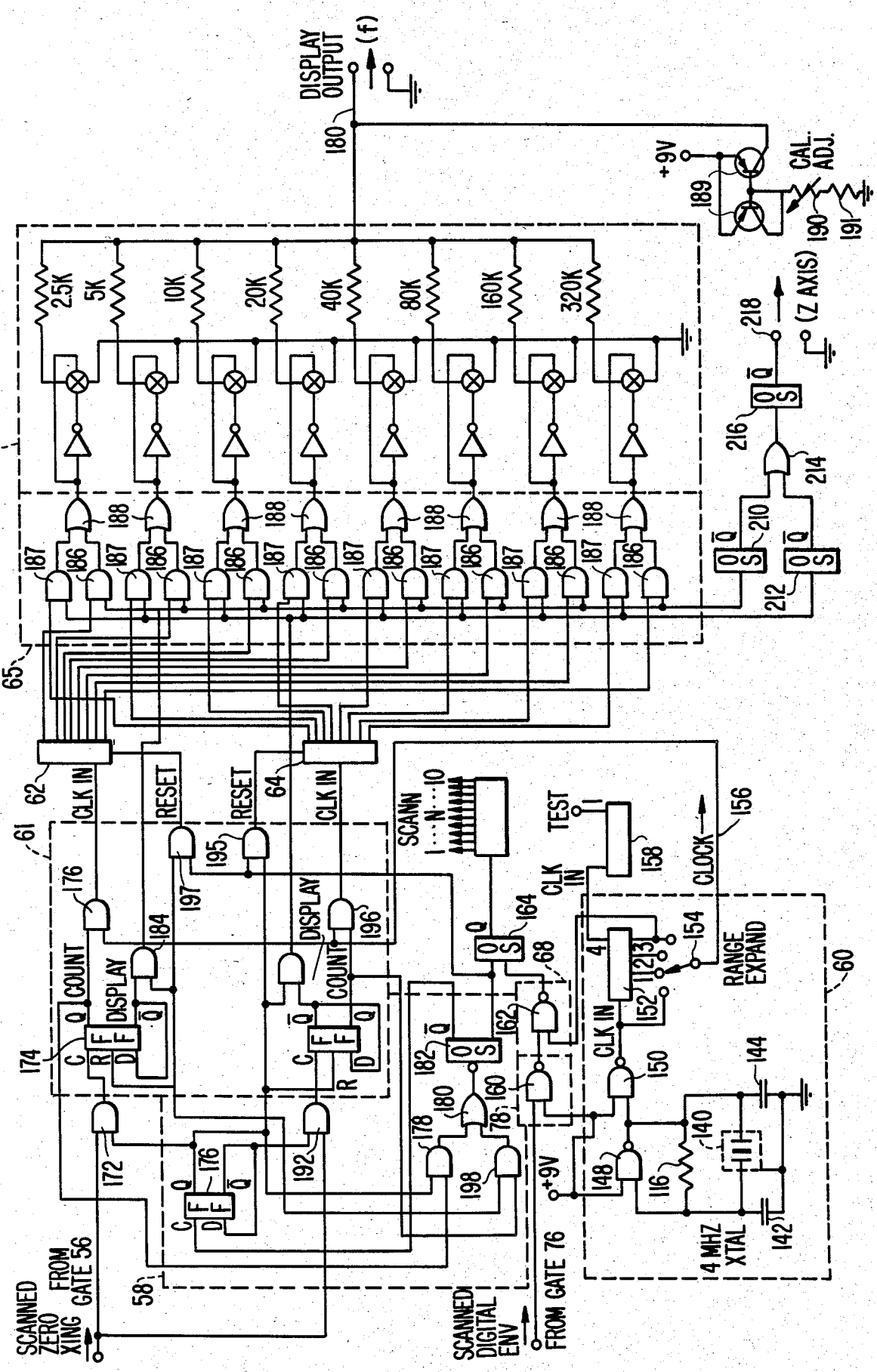
FIG. 11 is an electrical schematic diagram of the control and measurement portions of the analyzer shown in FIG. 7.

Referring now to FIG. 11, there is shown an electrical schematic diagram of remaining portions of the embodiment of the invention shown in FIG. 7, including flip-flop 58, clock 60, switch 61, counters 62 and 64, switch 65, reciprocal DAC 66, gate 68, and scan counter 70. As can be seen in FIG. 11, clock 60, in the preferred embodiment, comprises an oscillator including a quartz crystal 140, capacitors 142 and 144, resistor 146, and two-input NAND gates 148, 150. The above-identified components act in a well-known manner to produce clock pulses at the desired frequency. In the preferred embodiment, the clock pulses are produced at a frequency of 4MHz. The output of NAND gate 150 is supplied to a counter 152. Counter 152 divides the pulses supplied to its input to provide a plurality of regular pulse trains at its outputs, the frequency of the output pulse trains being a predetermined fraction of the frequency of the input pulses. A switch 154 is provided to selectively connect the output line 156 of clock 60 to either the input of counter 152 or a plurality of its outputs to provide a selectable clock frequency output to perform the function of frequency range expansion for analyzer 40.

As can be seen in FIG. 11, one of the outputs of counter 152 is supplied as an input to an additional counter device 158. Counter 158 further divides the clock frequency to provide a signal for testing the entire analyzer 40. If desired, counter 158 can be driven by the selected clock signal (range expand switch) operating the frequency-determining system to yield the same display at all range settings for testing the instrument. The test signal is applied to the input of analyzer 40 for use in initial set up or calibration of the analyzer 40.

The functions of inverter 78 and gate 68 of FIG. 7 are performed by a pair of two input NAND gates 160 and 162. The scanned digital envelope signal from comparator 74 and scan gate 76 of filter channel 50 (selected by scan counter 70) is connected to one input to NAND gate 160. Since the other input of NAND gate 160 is connected to a source of constant positive voltage, NAND gate 160 functions as an inverter to supply one input of NAND gate 162. The other input of NAND gate 162 is connected to an output of counter 152 and thus receives scanning pulses which are a submultiple of the 4MHz signal frequency produced by crystal 140. It will be recalled that the scanned digital envelope signal supplied to the control input of gate 68 in FIG. 11 is a logic signal indicative of whether or not the amplitude of an input signal frequency component present within the bandpass of the selected filter channel 50 is above a predetermined threshold. If the signal frequency component amplitude is not above the threshold, it can be seen that gate 162 thus supplies scanning pulses related to the output of clock 60 to a one-shot device 164. The output of one-shot 164 is a series of short duration pulses which are supplied to the input of scan counter 70. In the preferred embodiment, scan counter 70 is a type 4017 counter.

Each of the outputs of scan counter 70 is selectively and sequentially activated by input pulses supplied by one-shot 164. Thus, a single output of scan counter 70 will remain activated until the occurrence of the next pulse supplied by one-shot 164.

It can be seen that counter 152 of clock 60 thus provides two functions: it provides clock pulses for use in determining the length of the period between successive positive-going zero-crossings of the signal frequency component in question, and it provides scanning pulses to scan counter 70 to sequentially and selectively activate each of the filter channels 50.

If there is no signal component present within the bandpass of the selected filter channel 50, amplifier 122 at FIG. 8 will provide a logic low signal passing through gate 76 of FIG. 10 to become the scanned digital envelope signal. The logic low scanned digital envelope signal is thus inverted by NAND gate 160 of FIG. 11 and supplied as input to gate 162 to allow the passage of output pulses from counter 152 to one-shot 164 and produce scanning pulses to scan counter 70. Thus, the absence of a signal within the bandpass of the selected filter channel 50 will permit the scan counter 70 to activate the next sequential output thereof and select a different filter channel 50.

If, on the other hand, a signal component is present within the bandpass of selected filter channel 50, the scanned digital envelope signal output from gate 76 will be a logic high, inverted by gate 160 to deactivate gate 162 and prevent the application of scanning pulses to scan counter 70. Thus, the active output of scan counter 70 will remain active and scan counter 70 will not advance to the next output thereof, allowing the selected filter channel 50 to remain active and produce a zero-crossing period measurement in the manner to be more completely described hereinbelow.

It can be seen that one-shot 164 includes an additional input beyond that supplied by the output of NAND gate 162. This additional input comes from the measurement circuit and is activated at the completion of a zero-crossing time period measurement. One-shot 164 is then caused to produce a pulse to the input of scan counter 70, causing the scan counter 70 to advance to the next filter channel 50. The manner in which the additional input signal to one-shot 164 is produced will be described hereinbelow. It can be seen, therefore, that there are two ways in which scan counter 70 can be advanced to activate the next filter channel 50: first, the absence of a signal frequency component within the bandpass of the selected filter channel 50 and second, the completion of a zero-crossing time period measurement in a filter channel 50 in which there is present a signal frequency component with the filter channel bandpass.

The previously described circuitry of FIG. 11 has related to control of apparatus 40. The specific manner in which a zero-crossing time period measurement is performed will now be described. Referring to FIG. 11, it can be seen that the function of flip-flop 58 is performed by a number of circuit devices including a flip-flop 170. Flip-flop 170 may be, for example, one-half of a type 4013 dual D-type flip-flop device. The control signals for flip-flop 170 enter via its clock (C) and data (D) input pins. When power is first applied to analyzer 40, flip-flop 170 will arbitrarily assume one of two conditions. In the following description, it is assumed that the flip-flop 170 assumes a condition wherein the Q output thereof is a logic high and the $\overline{Q}$ output assumes a logic low condition. The Q output of flip-flop 170 is supplied to one input of a two-input AND gate 172, the other input of which is connected to the scanned zero-crossing signal from scan gate 56. Since the Q output of flip-flop 170 is high, the zero-crossing control pulses will pass through the gate 172 to the C input of a flip-flop 174 which forms one part of the switch 61 shown in FIG. 7. Device 174 is, again, a D-type flip-flop, with three inputs: clock (C), data (D), and reset (R). The first such zero-crossing control pulse will cause the Q output of flip-flop 174 to supply a logic high signal to one input of an AND gate 176. The other input of AND gate 176 is connected to clock output line 156. Thus, the clock pulses from clock 60 pass over output line 156 through gate 176 to the input of counter 62 to be accumulated therein.

When the next zero-crossing control pulse is produced by zero-crossing pulse generator 54, the pulse passes through gate 172 since the Q output of flip-flop 170 remains high. This causes the flip-flop 174 to reverse output state, causing the Q ouput of flip-flop 174 to go low and the $\overline{Q}$ output thereof to go high. The logic low signal on the Q output of flip-flop 174 deactivates gate 176, thus interrupting the flow of clock pulses to the counter 62. In addition, the logic low signal on the Q output of flip-flop 174 is supplied to the lower input of a two-input AND gate 178, the upper input of which is connected to the Q output of flip-flop 170. Prior to the arrival of the second scanned zero-crossing pulse, a logic high signal was produced at the output of AND gate 178 and passed through an OR gate 180 to a one-shot 182. When the second scanned zero-crossing pulse arrives, the Q output of flip-flop 174 passes from a logic high to a logic low condition. This change of state propagates through the gates 178 and 180 to one-shot 182. The input to one-shot 182 is an inverting input, so the transition from logic high to logic low causes the one-shot 182 to produce a pulse at its Q and $\overline{Q}$ outputs. The Q output causes one-shot 164 to generate a short pulse to the scan counter 70, causing the next sequential output of scan counter 70 to be activated. This in turn selects the next filter channel 50. This same low-to-high pulse (Q) from one-shot 182 is also delivered through an AND-gate 195 to reset counter 64 in preparation for receiving the clock pulses shortly to be gated through an AND-gate 196 by a flip-flop 194, when the next pair of scanned zero-crossing pulses arrive from the filter channel just switched in by the advance of scan counter 70. This works because flip-flop 170 changes state after the $\overline{Q}$ pulse from one-shot 182 goes from negative to positive, or on the trailing edge of the pulse. The Q pulse from one-shot 182 thus is allowed to reset counter 64.

In this manner, the logic state transition supplied to the input of one-shot 182 also causes a negative going pulse to appear in the $\overline{Q}$ output thereof. This negative going pulse is provided to the C input of flip-flop 170, causing flip-flop 170 to change state to produce a logic low at its Q output and a logic high at its $\overline{Q}$ output. As can be seen in FIG. 11, the $\overline{Q}$ output of flip-flop 170 is connected to the lower input of a two-input AND gate 184, the other input of which is connected to the $\overline{Q}$ output of flip-flop 174. Since the $\overline{Q}$ output of flip-flop 174 is, at this time, at a logic high condition, the logic high condition on the $\overline{Q}$ output of flip-flop 170 causes the AND gate 184 to produce a logic high signal at its output thereof. This high output enables the count accumulated in counter 62 to be displayed. Thus, the high output of AND-gate 184 produces a logic high at the lower input of a series of AND gates 186 which form part of switch 65. AND gates 186 cause the outputs of counter 62 to be supplied through a series of OR gates 188 to the input of reciprocal DAC 66. In the preferred embodiment gates 186 and 188 are provided by a pair of type 4019 devices and reciprocal DAC 66 is formed from a pair of type 4016 devices which are analog switches controlled by a digital signal. The output of counter 62 produces an analog signal at the output of reciprocal DAC 66 which is proportional to the reciprocal of the number of clock pulses accumulated between successive positive-going zero-crossings of a signal within the bandpass of the selective filter channel 50. This signal is in turn proportional to the time period between the successive zero-crossings. The output signal of reciprocal DAC 66 is then passed to the display device 80, not shown in FIG. 8.

Also connected to the output of reciprocal DAC 66 is a current-mirror constant-current-supply circuit consisting of a pair of transistors 189, a variable resistor 190 and a fixed resistor 191. Adjustment of variable resistor 190 controls the amount of a constant current delivered to the output side of the resistor ladder network of reciprocal DAC 66 to provide proper calibration of the output of display device 80.

At this point, the Q output of flip-flop 170 is low, and the $\overline{Q}$ output thereof is high, thereby disarming AND gate 172 and arming an AND gate 192. A zero-crossing control pulse received from the next filter channel 50 will thus be blocked from passing to flip-flop 174 and will go instead through gate 192 to a flip-flop 194. This causes the Q output of flip-flop 194 to go high, thus passing a logic high signal to one input of a two-input AND gate 196. As can be seen in FIG. 11, the other input of AND gate 196 is connected to the clock line 156. Therefore, pulses produced by clock 60 will be passed through AND gate 196 to counter 64 to be accumulated.

The switching of flip-flop 194 causes a logic high signal to propagate from the Q output thereof to the lower input of a two-input AND gate 198, the other input of which is connected to the $\overline{Q}$ output of flip-flop 170. Since the $\overline{Q}$ output of flip-flop 170 is high, a logic high signal will propagate through OR gate 180 to one-shot 182. Since OR-gate 180 is connected to one-shot 182 via an inverting input, a positive to negative transition of the output of OR-gate 180 will trigger the production of a pulse from one-shot 182. Thus, when the $\overline{Q}$ output of flip-flop 194 goes high after occurrence of the second scanned zero-crossing pulse (gating clock pulses into counter 64), the Q output goes low, triggering one-shot 182 via gates 198 and 180.

Counter 64 then accumulates clock pulses over clock line 156 until such time as an additional zero-crossing control pulses are received from the zero-crossing pulse generator 54 of the selected filter channel 50. The circuitry will cause the clock pulses to be interrupted to the counter 64, the output of counter 64 to be supplied through a series of AND gates 187 of switch 65 to reciprocal DAC 66, and scan counter 70 to be advanced to the next filter channel having a signal frequency component within the bandpass thereof. In this manner, zero-crossing period measurements are made for each of the contiguous sub-bands associated with each of the filter channels 50. The zero-crossing period measurements are converted into frequency signals and provided as a substantially simultaneous display on the display device 80.

As can be seen in FIG. 11, a pair of one-shot devices 210 and 212 are provided, connected to the series of AND gates 186 and 187, respectively. The one-shot devices 210 and 212 produce pulses through OR gate 214 to activate a one-shot device 216, thus producing a pulse at an output terminal 218 which is supplied to the Z axis, or intensity input, of the display device 80. In this manner, a spot of light corresponding to a specific time is produced on display device 80 for the zero-crossing measurement just made, and the display device 80 will not produce a visual output when switching from display of a signal produced by one filter channel 50 to the next filter channel 50. The persistance of the phosphor on display device 80 will produce a substantially simultaneous display of the time period reciprocals in each of the sub-bands.

The analyzer 40 includes amplitude means connected to the display device 80 for producing a signal proportional to the amplitude of signals in each of the sub-bands, and for producing a display indicative of the amplitude of signals in each of the sub-bands. As embodied herein, this amplitude means includes rectifier-integrator 72, amplitude switches 79, an amplitude display control circuit 307 and display device 80.

Figure 12:
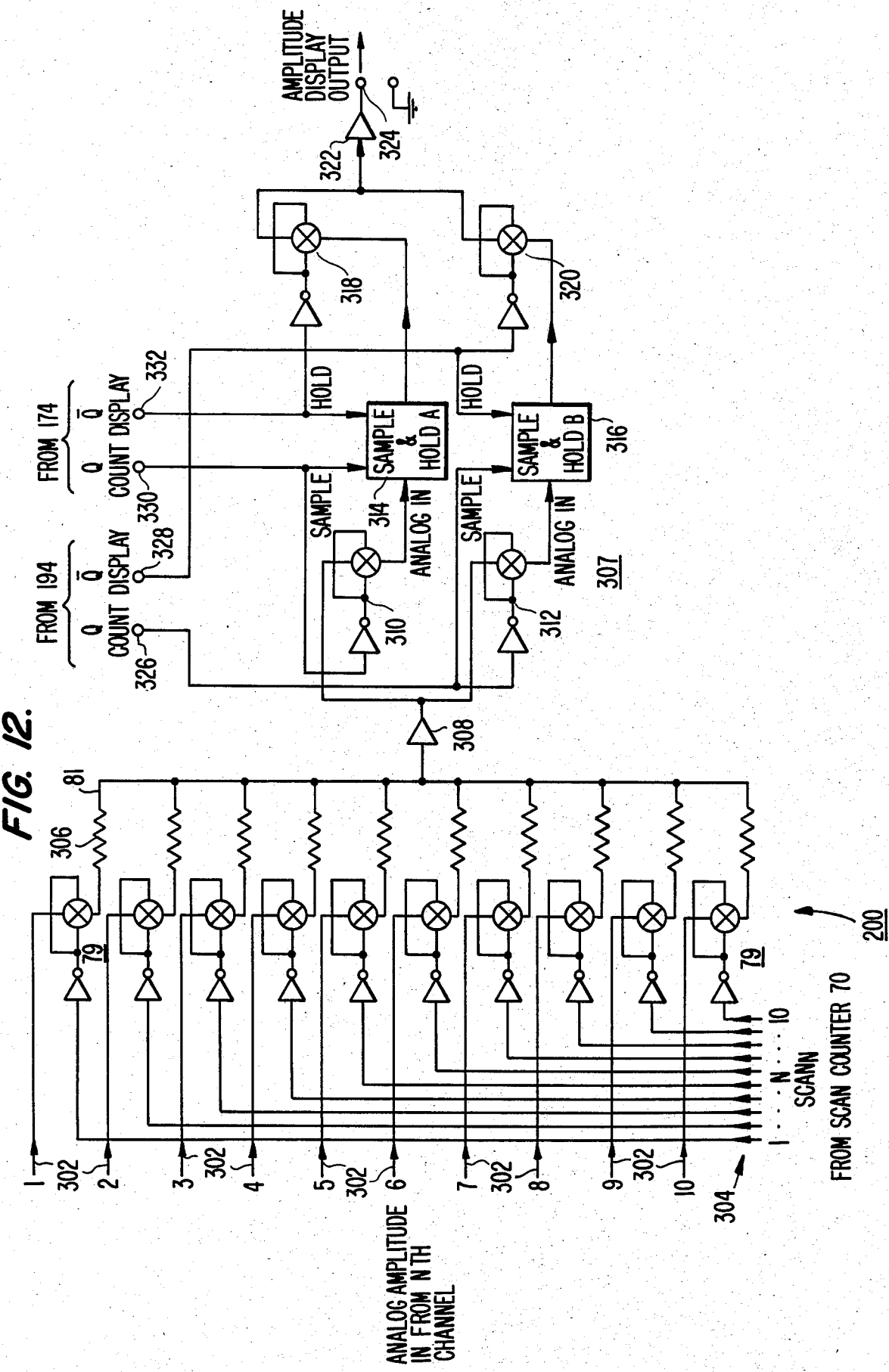
FIG. 12 is an electrical schematic diagram of an amplitude scanner and analog display control circuit for producing a frequency vs. amplitude display.

Referring now to FIG. 12, there is shown an amplitude scanner 200 formed from the analog switches 79 of each of the filter channels 50. The functions of the analog switches 79 is performed by three type 4016 quad devices, each of which is, as previously described, an analog switch controlled by a digital signal. It passes the amplitude voltage on digital command.

Each of the analog switches 79 includes an output resistor 306 connected to output terminal 81. The output of each of the rectifier-integrators 72 from the filter channels 50 is connected to a series of analog amplitude input terminals 302 each connected to one of the analog switches 79. Scanning lines from the scan counter 70 are provided to a plurality of amplitude selector inputs 304. Each of the amplitude selector inputs 304 is connected to that output of the scan counter 70 which is associated with the specific filter channel 50. Thus, when filter channel 50 including bandpass filter $F_1$ is selected by scan counter 70, the appropriate amplitude selector input 304 is also activated, to cause the output of the rectifier-integrator 72 from that filter channel to be supplied through the appropriate analog switch 79 and output 81.

Each of the output terminals 81 of the analog switches 79 is connected in parallel to an amplitude display control circuit 307 having an input amplifier 308 and a pair of parallel connected analog switches 310 and 312. The analog switches 312 comprise one-half of another type 4016 device. As can be seen, the output of analog switches 310 and 312 are respectively supplied to a pair of sample and hold devices 314 and 316. The outputs of each of the sample and hold devices 314 and 316 are respectively supplied to a pair of analog switches 318 and 320, the outputs of which are connected in parallel through an output amplifier 322 to an analog display output terminal 324.

The analog display control circuit 307 is responsive to the Q and $\bar{Q}$ outputs of flip-flops 174 and 194 of FIG. 11 which control the count/display functions of the counters 62 and 64, respectively. Thus, the Q output of flip-flop 194 is connected to an input terminal 326 of the analog display control circuit 307, the $\bar{Q}$ output of the flip-flop 194 is connected to an input terminal 328, the Q output of flip-flop 170 is connected to an input terminal 330 and the $\bar{Q}$ output of flip-flop 174 is connected to an input terminal 332.

In operation, the analog switches 79 select the amplitude signal corresponding to the zero-crossing measurement currently being performed at any particular moment and direct the amplitude signal through one of the switches 310 or 312 to one of the sample and hold devices 314 or 316. The amplitude signal is thus stored as an analog voltage by the sample and hold device operating in the sample mode. When the corresponding counter 62 or counter 64 of FIG. 11 is switched to display mode, the associated sample and hold device 314 or 316 is switched with it to the hold mode and the analog amplitude voltage is then made available at the same time as the frequency measurement of the selected filter channel 50 to control the display device 80. The simultaneous availability of frequency and amplitude signals at the output terminals 189 of FIG. 11 and 324 of FIG. 12, respectively, permits the display in realtime of the amplitude spectrum of the signal being processed. The Z axis pulses from the output terminal 218 are still used to produce spots of light on the screen of display device 80. The frequency signal from output terminal 189 can be applied as the horizontal axis input to display device 80 and the amplitude signal from output terminal 324 as the vertical axis input. Either signal can be displayed on a linear or logarithmic scale to produce the type of display desired by the user. Alternatively, the previously described time vs frequency display can be provided, with the amplitude signal from terminal 324 being used to intensify the spots produced by the Z axis pulses from terminal 218, the resulting display thus combining time, frequency, and intensity.

It will be apparent to those skilled in the art that various modifications and variations can be made in the signal analyzer of the present invention without departing from the scope or spirit of the invention. Thus, it is intended that the present invention cover the modifications and variations of the invention, provided they come within the scope of the appended claims and their equivalents.

What is claimed is:

1. Apparatus for analyzing an acoustical signal having a plurality of signal components extending over a band of signal frequencies, comprising:
   means for separating an acoustical signal into a plurality of sub-bands;
   means for measuring the time period between successive zero-crossings of signal components in each of said sub-bands;
   reciprocal means for extracting the reciprocal of the zero-crossing time periods of signal components in each of said sub-bands;
   display means for simultaneously displaying the time period reciprocals of signal components in each of said sub-bands; and
   means for sequentially scanning each of said sub-bands for the presence of a signal component therein, for causing a zero-crossing time period measurement to be made if said signal component is present in the selected sub-band, and for advancing to the next sub-band if no such signal component is present.

2. Apparatus as recited in claim 1 wherein said separating means comprises a plurality of parallel-connected filter channels each comprising a bandpass filter.

3. Apparatus as recited in claim 1 wherein said measuring means comprises a clock and a pair of counters.

4. Apparatus as recited in claim 1 wherein said reciprocal means comprises a reciprocal-taking digital-to-analog converter.

5. Apparatus as recited in claim 1 comprising amplitude means connected to said display means for producing a signal proportional to the amplitude of signal components in each of said sub-bands and for producing a display indicative of the amplitude of signal components in each of said sub-bands.

6. Apparatus as recited in claim 5 wherein said display means produces an indication proportional to time, and said reciprocal means and said amplitude means are connected to said display means so as to produce a display indicative of the amplitude and frequency of an acoustical signal as a function of time.

7. Time domain signal analyzing apparatus, comprising:
   (a) a plurality of filter channels, each responsive to a portion of the frequency spectrum of signals being analyzed, and each comprising:
   (i) a bandpass filter, (ii) means for producing zero-crossing control pulses designating zero-crossings of output signals from said bandpass filter, and (iii) means for producing an activation signal whenever the output signal from said bandpass filter exceeds a predetermined threshold;

(b) a clock for producing a series of regular clock pulses;

(c) a counter for producing a digital output signal proportional to the number of said clock pulses received at the input of said counter;

(d) connecting means for supplying said clock pulses to said counter in response to said zero-crossing control pulses;

(e) scanning means for sequentially connecting said filter channels to said connecting means such that a pair of said zero-crossing control pulses from a connected filter channel causes said connecting means to supply a number of said clock pulses to said counter proportional to the time period between zero-crossings of the output of the bandpass filter of said connected filter channel, said scanning means comprising a scan counter having a plurality of outputs each connected to one of said filter channels, said outputs being individually and selectively activated by pulses supplied to said scan counter, and a gate having an input connected to said clock, an output connected to said counter, and a control terminal connected to said activation signal means such that the presence of said activation signal blocks the flow of signals from said clock to said scan counter;

(f) reciprocal means for providing a value proportional to the reciprocal of said counter digital output signal; and (g) display means for displaying the output of said reciprocal means.

8. Apparatus as recited in claim 7 comprising a pair of counters each adapted to alternately accumulate clock pulses in response to said zero-crossing control pulses and to hold the accumulated count of said clock pulses from a previously connected one of said filter channels.

9. Apparatus as recited in claim 8 wherein said connecting means comprises switch means for switching said clock pulses between said counters, and a flip-flop means for controlling said switch means in response to said control pulses.

10. Apparatus as recited in claim 9 wherein said flip-flop means comprises a first flip-flop having a normal output terminal and an inverted output terminal, first and second two-input AND gates having their first inputs connected to the normal and inverted outputs, respectively, of said first flip-flop, and their second inputs supplied with said control pulses, and their outputs connected to said switch means.

11. Apparatus as recited in claim 10 wherein said switch means comprises second and third flip-flops, the inputs of said second and third flip-flops being connected to the outputs of said first and second two-input AND gates, respectively.

12. Apparatus as recited in claim 7 wherein said scan counter input is also connected to said flip-flop means such that occurrence of the second of said control pulse pair is operative to cause said scan counter to activate the next scan counter output in sequence.

13. Apparatus as recited in claim 7 wherein said scanning means comprises first and second scan gates each having a likenumbered plurality of two input AND gates and a plural input OR gate, the first input of each of said first scan gate AND gates being connected to the output of said control pulse producing means of one of said filter channels, the first input of each of said second scan gate AND gates being connected to the output of said activation signal means of one of said filter channels, and the second input of each of said first and second scan gate AND gates being connected to one of said scan counter outputs, the outputs of each of said first scan gate AND gates being connected to a separate input of said second scan gate OR gate.

14. A method for analyzing an acoustical signal having a plurality of signal components extending over a band of signal frequencies, comprising the steps of:

separating an acoustical signal into a plurality of adjacent sub-bands;

sequentially scanning each of said sub-bands for the presence of a signal component therein;

causing a zero-crossing time period measurement to be made if said signal component is present in the selected sub-band;

extracting the reciprocal of the zero-crossing time periods of signal components in each of said sub-bands;

advancing to the next sub-band if no such signal component is present; and simultaneously displaying the time period reciprocals of signal components in each of said sub-bands.

* * * * *